No. 683,856. Patented Oct. 1, 1901.
J. HULTZ.
CAR BRAKE.
(Application filed Apr. 27, 1900.)
(No Model.) 2 Sheets—Sheet 1.

Witnesses
E. W. Hart.
Ralph S. Warfield.

Inventor
Joseph Hultz
by John H. Coss
his Attorney

No. 683,856. Patented Oct. 1, 1901.
J. HULTZ.
CAR BRAKE.
(Application filed Apr. 27, 1900.)
(No Model.) 2 Sheets—Sheet 2.

Witnesses
E. W. Hart.
Ralph H. Warfield

Inventor
Joseph Hultz
by John H. Coss
his Attorney

THE NORRIS PETERS CO., PHOTO-LITHO., WASHINGTON, D. C.

UNITED STATES PATENT OFFICE.

JOSEPH HULTZ, OF MANSFIELD, OHIO.

CAR-BRAKE.

SPECIFICATION forming part of Letters Patent No. 683,856, dated October 1, 1901.

Application filed April 27, 1900. Serial No. 14,609. (No model.)

*To all whom it may concern:*

Be it known that I, JOSEPH HULTZ, a citizen of the United States of America, residing at 131 East Fifth street, Mansfield, Richland county, Ohio, have invented a new and useful Car-Brake, of which the following is a specification.

My invention relates to improvements in a car-brake in which a sheave-pulley having a ratchet-wheel on each side thereof and made integral with said sheave-pulley operates in conjunction with two levers, the function of one lever being to lock or brake the wheels of a car or other vehicle and the function of the other lever being to release said wheels at the will of the operator.

The objects of my invention are, first, to provide a brake that is powerful and positive in its operation and means to operate said brake that will produce a maximum pressure or friction against the wheels, thereby retarding them more or less with a minimum amount of physical exertion; second, to construct a brake that is simple, efficient, practical, quick, and positive in action, and, third, to construct a brake that can be attached to any part of a car or other vehicle and operated with safety and efficiency on the end, top, or platform of a car when the brake is applied to the wheels of the car or released. I attain these objects by the mechanism illustrated in the accompanying drawings, in which—

Figure 1:
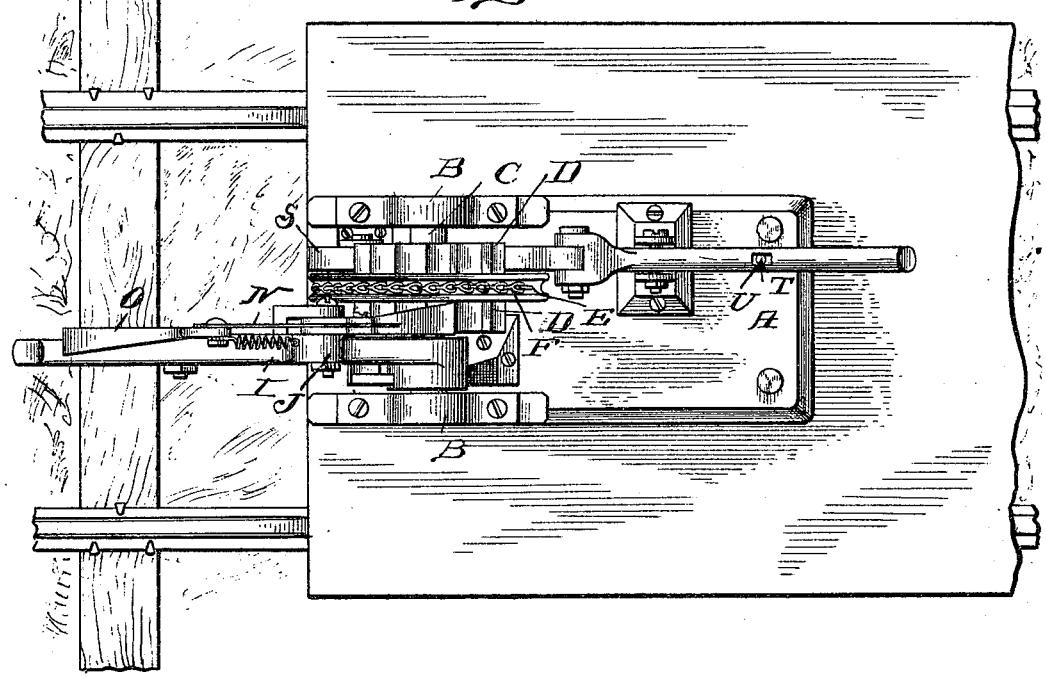
Figure 2:
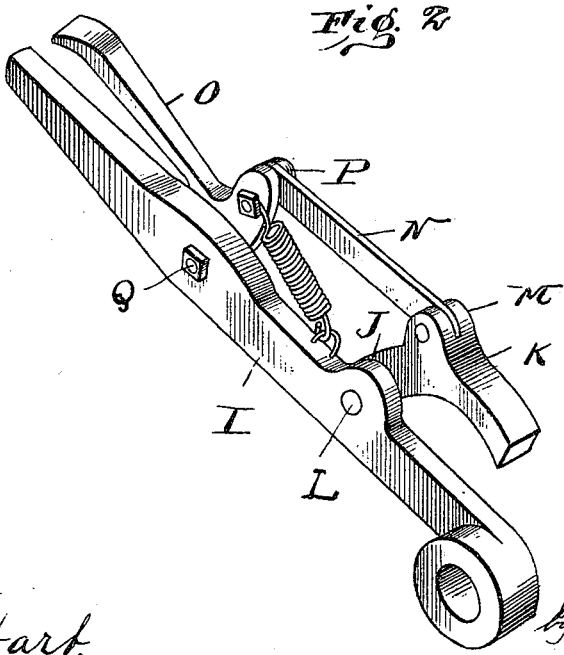
Figure 4:
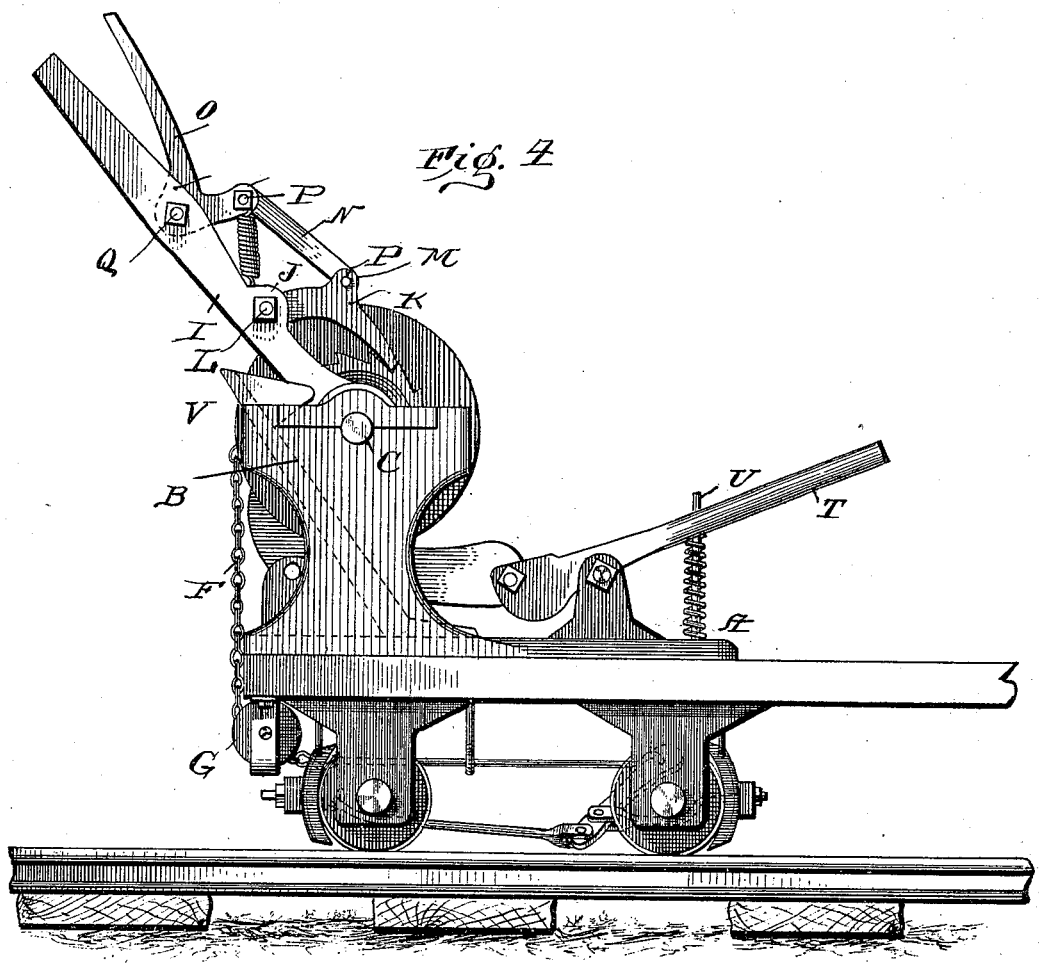
Figure 3:
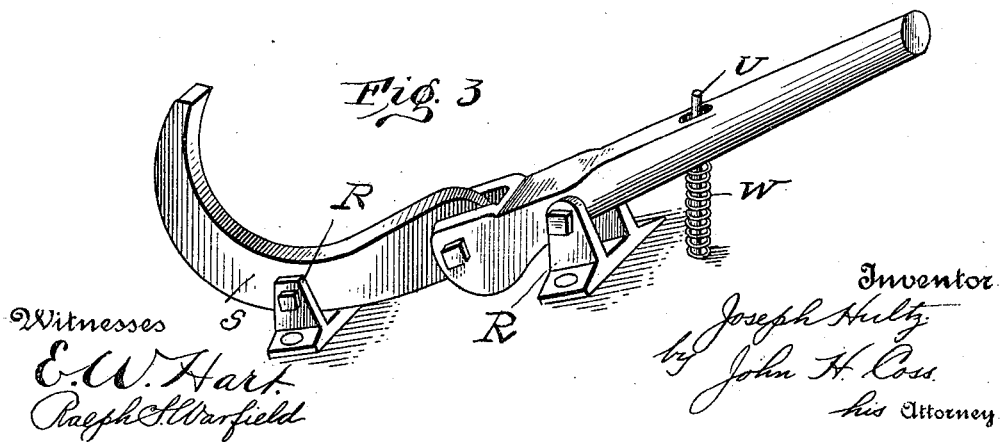

Figure 1 is a plan view of the entire brake. Fig. 2 is a detailed view in perspective of the brake-lever. Fig. 3 is a detailed view in perspective of the releasing-lever. Fig. 4 is a side view of the brake, showing the brake locked and the method of connecting the brake-chain to the brake-rod.

Similar letters refer to similar parts throughout the several views.

The bed-plate A and the standards or bearings B B constitute the framework of the brake. A shaft C is fitted and journaled in the standards B B, to which is attached and keyed solidly thereon a sheave-pulley having ratchet-wheels D D on each side thereof and made integral with said sheave-pulley. A staple E, bolt, screw-eye, or any other suitable fastening device is attached to the sheave-pulley in the center of the groove. To said fastening device E a chain F is attached and passes around the circumference of said sheave-pulley and roller G and is attached to the brake-rod. A lever I is fitted loosely on the shaft C, having an ear or flange J projecting upwardly from the upper side of the lever and extending on one side of the lever I far enough to bring it in alinement with the ratchet-wheel. In said offset or extension a slot is cut, into which the end of the pawl K is inserted and held in position by the bolt L, which passes through the ears and pawl K. Said pawl has an ear M extending from the top with a slot cut therein. A connecting-bar N is inserted in the slot and is connected with the wing of the small lever O by means of the bolts P P.

The lever O is attached to the lever I by means of a bolt Q at a point on the lever I which will bring the handles of the lever I and O in alinement with each other. A coil-spring is attached immediately under the lever I on one end and to the bolt P, which passes through the wing of the small lever O, the purpose of which is to keep the pawl K in contact with the ratchet-wheel.

To the bed-plate A a brace V is attached to hold the lever I in position. The upper position of said brace has a rest made integral with said brace and when attached to the bed-plate sustains the lever in an upright position when not in use. On the opposite side of the sheave-pulley and immediately under the ratchet-wheel a releasing-lever T is attached and connected with a pawl of peculiar construction, forming a toggle-joint.

To the bed-plate A two standards R R are attached. A pawl S is inserted in the slot of one of said standards and held in position by a bolt. The pawl S is formed and shaped so that it will come in contact with the teeth of the ratchet-wheel at the center of its diameter, thereby securely locking the brake. The other end of the pawl S is made heavy, the purpose of which is to hold the pawl in contact with the ratchet-wheel by gravity. To the end of said pawl S the releasing-lever T, having a slot cut in the end thereof for the purpose of connecting said lever to the pawl S, is attached. The releasing-lever is attached and held in position by means of the standard R, close to the end of the lever T.

In the lever T a slot is cut to permit the pin U to pass. A coil-spring W is placed on said pin and presses on the under side of the lever T, holding the pawl S in contact with the teeth of the ratchet-wheel and locking the brake.

It is obvious that my brake can be used on all kinds of vehicle-wheels without deviating from the principle and is especially adapted for street-car service.

Having fully described my invention, what I claim as new, and desire to secure by Letters Patent, is—

1. A car-brake composed of a sheave-pulley having ratchet-wheels on each side thereof, a brake-lever fitted to rotate loosely on a shaft having an ear or flange projecting from the upper side thereof, with a slot cut therein to receive a pawl adapted to come in contact with the teeth of the ratchet-wheel, a pawl journaled in said slot having an ear or flange formed thereon with a slot cut in said ear or flange to receive a connecting-rod, a connecting-rod to the ear or flange of said pawl adapted to be connected to a lever, a coil-spring attached to the lever I and the wing of the lever O adapted to keep the pawl in contact with the ratchet-wheel.

2. The combination in a car-brake, of a sheave-pulley, ratchet-wheels made integral with said pulley, a brake-lever fitted to rotate loosely on a shaft, having an ear or flange projecting upwardly from the upper side thereof, with a slot cut therein to receive a pawl, a pawl journaled in said slot having an ear or flange formed thereon with a slot cut in said ear or flange to receive a connecting-rod, a connecting-rod attached to the ear or flange of said pawl, a small lever, having a wing thereon to connect with said rod, a coil-spring, attached to the lever I and the wing of the lever O, and adapted to keep the pawl K in contact with the teeth of the ratchet-wheel.

3. A car-brake composed of a sheave-pulley, ratchet-wheels made integral and keyed solidly on a shaft, said shaft journaled in fixed bearings, a brake-lever loosely journaled in a shaft, having a lever and pawl attached thereto and adapted to be brought in and out of contact with the teeth of the ratchet-wheel, a releasing-lever attached to a standard with a pawl connected to the end thereof adapted to come in contact with the ratchet-wheels, said releasing-lever independent of said brake-lever and adapted to normally and automatically engage said ratchet-wheel.

4. The combination in a car-brake of a locking-pawl having one end fitted to come in contact with the teeth of a ratchet-wheel, and attached to the bed-plate A, a releasing-lever, having a slot cut in the end thereof, and connected with the locking-pawl, said lever being attached to the bed-plate, by means of a standard, and retained in position at an angle of forty-five degrees, a pin attached to the bed-plate, passing through a vertical slot, cut in the releasing-lever, a coil-spring fitted thereon, and pressing against the under side of the releasing-lever, thereby locking the pawl in positive contact with its respective ratchet-wheel.

5. A car-brake composed of a sheave-pulley having ratchet-wheels made integral, a brake-lever loosely journaled on a shaft, a jointed releasing-lever attached to a bed-plate and adapted to release said brake, the brake automatically and normally engaging the ratchet-wheel, a rest attached to the bed-plate A adapted to hold and retain the brake-lever in position substantially as and for the purpose set forth.

6. In a car-brake a shaft journaled in two standards made integral with the bed-plate, a sheave-pulley, ratchet-wheels on each side thereof, a brake-lever having a pawl and small lever attached thereto, a connecting-rod, a coil-spring, adapted to keep said pawl in contact with the ratchet-wheel, a releasing-lever attached to the bed-plate, a pawl connected thereto, substantially as and for the purpose set forth.

7. In a car-brake, the combination with a grooved wheel, said wheel secured on a shaft, a standard in which said shaft is journaled whereby said wheel is located fixedly and stationary with relation to said standard, means connected to the grooved wheel and to the brakes, ratchet-wheels on either side of said grooved wheel, a hand-lever automatically and normally in engagement with one of said ratchet-wheels and adapted to give it a forward rotation, a second lever adapted to normally engage the other of said ratchet-wheels to hold it stationary and a brace for supporting the hand-lever when not in use.

8. In a car-brake, the combination with a grooved wheel journaled upon the car, of ratchet-wheels secured on either side of said grooved wheel, a hand-lever adapted to engage one of the ratchet-wheels whereby to actuate it, a second lever independent of said hand-lever and adapted to normally and automatically engage the other of said ratchet-wheels to hold it stationary and means connecting the grooved wheel and the brakes whereby to tighten the latter when the hand-lever is operated.

9. In a brake mechanism, the combination with a grooved wheel journaled in fixed stationary bearings, and ratchet-wheels secured on either side of said grooved wheel, of a hand-lever adapted to engage one of said ratchet-wheels whereby to actuate the grooved wheel, a second lever independent of said hand-lever, said last-named lever normally and automatically engaging the other of said ratchet-wheels whereby to hold the grooved wheel stationary when the hand-lever is being retracted to obtain a new hold, and means connecting the grooved wheel and the brakes whereby the latter are tightened when the hand-lever is operated.

Signed by me at Mansfield, Richland county, Ohio, this 21st day of April, 1900.

JOSEPH HULTZ.

Witnesses:
 FRANK HULTZ,
 H. E. BELL.